(12) United States Patent
 Clarke

(10) Patent No.: US 11,613,211 B2
(45) Date of Patent: Mar. 28, 2023

(54) ADAPTER BRACKET FOR SECURING A SIDE MIRROR TO A VEHICLE

(71) Applicant: Wayne Gary Clarke, Spring, TX (US)

(72) Inventor: Wayne Gary Clarke, Spring, TX (US)

( * ) Notice: Subject to any disclaimer, the term of this patent is extended or adjusted under 35 U.S.C. 154(b) by 0 days.

(21) Appl. No.: 17/683,413

(22) Filed: Mar. 1, 2022

(65) Prior Publication Data

US 2022/0185184 A1 Jun. 16, 2022

Related U.S. Application Data

(63) Continuation-in-part of application No. 16/990,963, filed on Aug. 11, 2020, now Pat. No. 11,299,095.

(51) Int. Cl.
*B60R 1/078* (2006.01)
*F16B 11/00* (2006.01)

(52) U.S. Cl.
CPC ............ *B60R 1/078* (2013.01); *F16B 11/006* (2013.01)

(58) Field of Classification Search
CPC . B60R 1/078; B60R 1/06; F16B 37/00; F16B 11/006
USPC .... 248/544, 466, 467, 475.1, 476, 479, 481, 248/482, 485
See application file for complete search history.

(56) References Cited

U.S. PATENT DOCUMENTS

| | | | | |
|---|---|---|---|---|
| 1,956,518 A * | 4/1934 | Paulus | ...................... | B60R 1/06 248/481 |
| 4,253,633 A * | 3/1981 | Takegawa | ................. | B60R 1/06 248/222.12 |
| 4,368,868 A * | 1/1983 | Urban | ................... | B60R 1/0605 248/479 |
| 4,500,063 A * | 2/1985 | Schmidt | .................... | B60R 1/06 248/314 |
| 4,818,088 A * | 4/1989 | Sacknoff | ................... | B60R 1/06 359/872 |
| 4,991,814 A * | 2/1991 | Schmidt | ............... | B60R 1/0605 359/872 |
| 5,069,410 A * | 12/1991 | McKee | ................. | B60R 1/0605 248/475.1 |
| 6,109,586 A * | 8/2000 | Hoek | ...................... | B60R 1/076 248/478 |
| 6,411,447 B1 * | 6/2002 | Hilbert | ................. | G02B 7/1825 359/822 |
| 7,543,788 B2 * | 6/2009 | Herb | ........................ | F16L 3/16 248/299.1 |

(Continued)

*Primary Examiner* — Eret C McNichols
*Assistant Examiner* — Michael McDuffie
(74) *Attorney, Agent, or Firm* — Jeffrey Streets; Madan Law PLLC

(57) ABSTRACT

An apparatus for securing a side mirror to a vehicle includes an adapter bracket and a solid body secured to the adapter bracket with screws. The adapter bracket has a plurality of first bracket holes in a first hole pattern and a plurality of second bracket holes in a second hole pattern. Each first bracket hole is positioned to align with a threaded hole in an exterior of the vehicle for receiving a screw through a first bracket hole and threadably fastening the screw to the threaded hole to secure the adapter bracket to the vehicle. A solid body has first and second threaded blind holes in a base surface for alignment with the second bracket holes for securing the solid body to the adapter bracket with screws. A third threaded hole in a top surface of the solid body is adapted for threadably securing the side mirror.

20 Claims, 9 Drawing Sheets

(56) References Cited

U.S. PATENT DOCUMENTS

| | | | | |
|---|---|---|---|---|
| 8,056,879 B2* | 11/2011 | Chang | .................. | G02B 7/1825 |
| | | | | 248/478 |
| 8,807,510 B2* | 8/2014 | Sugisaka | ................... | B60R 1/06 |
| | | | | 359/872 |
| 9,180,816 B2* | 11/2015 | Dutton | ....................... | B60R 1/04 |
| 9,221,398 B1* | 12/2015 | Englander | ................ | B60R 1/06 |
| 9,751,466 B2* | 9/2017 | Huang | .................... | B60R 1/081 |
| 10,502,361 B2* | 12/2019 | Braun | ....................... | B60R 1/06 |
| 11,299,095 B2* | 4/2022 | Clarke | .................... | F16B 37/00 |
| 2016/0368419 A1* | 12/2016 | Toth | ........................ | B60R 1/078 |
| 2019/0283674 A1* | 9/2019 | Bennett | .................. | B60R 1/078 |
| 2019/0299844 A1* | 10/2019 | Yoshioka | ............. | B60Q 1/0005 |
| 2020/0079290 A1* | 3/2020 | Portuallo | ................. | B60R 1/12 |
| 2022/0041113 A1* | 2/2022 | Bennett | ................. | E05D 5/0207 |

* cited by examiner

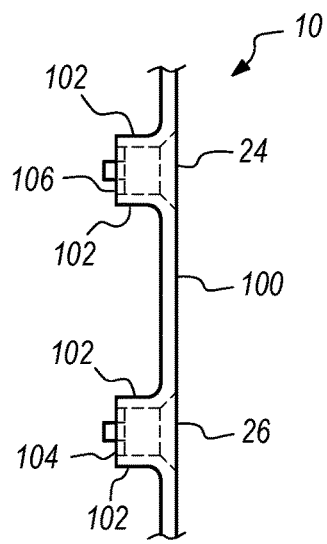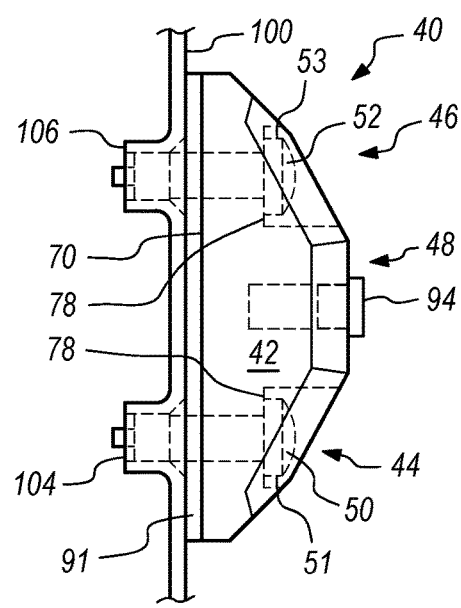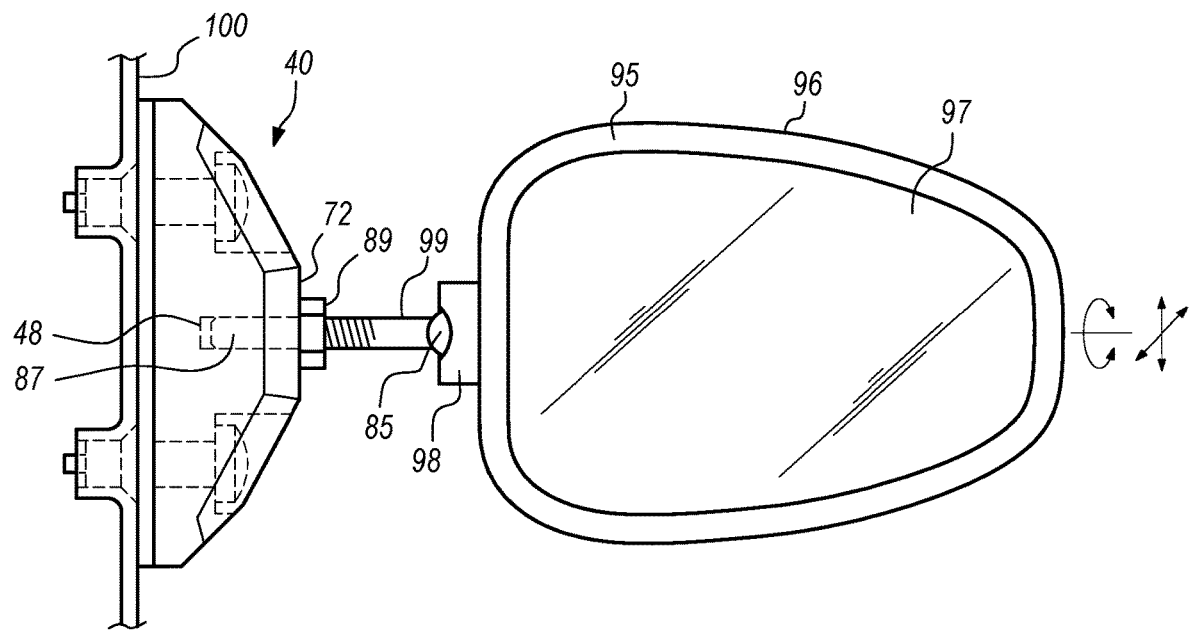

ADAPTER BRACKET FOR SECURING A SIDE MIRROR TO A VEHICLE

CROSS-REFERENCE TO RELATED APPLICATIONS

This application is a continuation-in-part of U.S. patent application Ser. No. 16/990,963 filed on Aug. 11, 2020, which application is incorporated by reference herein.

BACKGROUND

The present disclosure relates to an apparatus for securing a side mirror to a vehicle.

BACKGROUND OF THE RELATED ART

Vehicles have side mirrors to enable a person seated in the vehicle to face forward yet see objects and activity along the sides of the vehicle. The angle of the side mirror is generally adjustable according to the person's height, the vehicle's seat position, and the person's desired viewing area. The ability to see objects and activity along the sides of the vehicle improves the safety of the person driving the vehicle. Accordingly, side mirrors are standard equipment on most vehicles.

The side mirrors are often secured to the doors of the vehicle, including the driver side door for seeing along the driver side of the vehicle and the passenger side door for seeing along the passenger side of the vehicle. However, some vehicles have a feature where the doors may be removed. Unfortunately, removal of the doors also removes the side mirrors, thereby reducing the safety and drivability of the vehicle.

BRIEF SUMMARY

Some embodiments provide an apparatus for securing a side mirror to a vehicle. The apparatus comprises an adapter bracket having a plurality of first bracket holes arranged in a first hole pattern and a plurality of second bracket holes arranged in a second hole pattern. Each first bracket hole is positioned to align with a threaded hole in the exterior of the vehicle for receiving a screw through the first bracket hole and threadably fastening the screw to the threaded hole to secure the adapter bracket to the exterior of the vehicle. The apparatus further comprises a solid body having a base surface, a top surface opposite the base surface, first and second threaded blind holes extending into the solid body from the base surface, and a third threaded hole extending into the solid body from the top surface in a central area between the first and second holes. Each of the first and second threaded blind holes are aligned with one of the second bracket holes, wherein screws extend through the second bracket holes and are threadably fastened to the first and second threaded blind holes to secure the solid body to the adapter bracket. The third threaded hole is adapted to threadably secure a threaded end of a post that is attached to the side mirror.

Some embodiments provide a kit for securing a side mirror to a vehicle. The kit comprises an adapter bracket having a plurality of first bracket holes arranged in a first hole pattern and a plurality of second bracket holes arranged in a second hole pattern, wherein each first bracket hole is positioned to align with a threaded hole in the exterior of the vehicle for receiving a screw through the first bracket hole and threadably fastening the screw to the threaded hole to secure the adapter bracket to the exterior of the vehicle. The kit further comprises a solid body having a base surface, a top surface opposite the base surface, first and second threaded blind holes extending into the solid body from the base surface, and a third threaded hole extending into the solid body from the top surface in a central area between the first and second holes. Each of the first and second threaded blind holes are positioned to align with one of the second bracket holes, and the third threaded hole is adapted to threadably secure a threaded end of a post that is attached to the side mirror. Still further, the kit comprises first and second screws each having a threaded shaft and a head, wherein the threaded shaft of either of the first and second screws is insertable into either of the second bracket holes and threadably securable to the first and second threaded blind holes in the solid body to secure the solid body to the adapter bracket.

BRIEF DESCRIPTION OF THE SEVERAL VIEWS OF THE DRAWINGS

FIG. 5A is a side view of two threaded holes in a vehicle.

FIG. 5B is a side view of a side mirror bracket secured to the vehicle making use of the two threaded holes in the vehicle.

FIG. 5C is a side view of a side mirror secured to the side mirror bracket that has been secured to the vehicle.

DETAILED DESCRIPTION

Figure 1A:
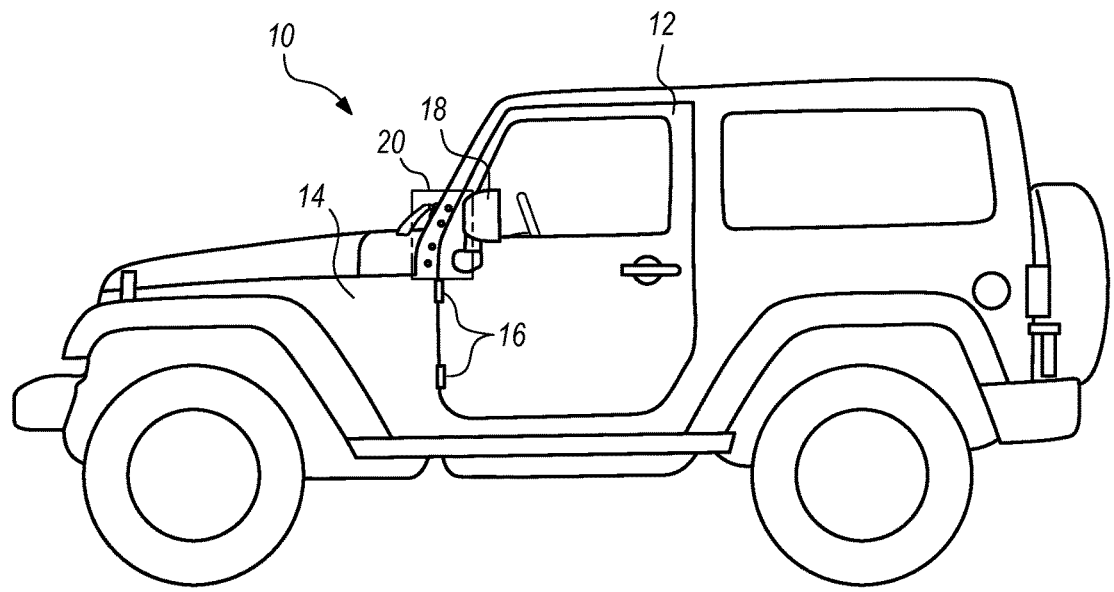
FIG. 1A is a driver's side view of a vehicle with the doors installed.

Some embodiment provides an apparatus for securing a side mirror to a vehicle. The apparatus may include a solid body having a base surface and a top surface, wherein the base surface has a contour that is complementary to a contour of an exterior surface of the vehicle. The apparatus may further include first and second holes through the solid body from the base surface to the top surface. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle, and wherein each of the first and second holes has a counterbore that opens to the top surface of the rigid body. Still further, the apparatus may include a third hole that opens to the top surface in an area between the counterbores of the first and second holes, wherein the third hole is threaded to receive a threaded screw that attaches a mirror.

The solid body may be made with any weather resistance and rigid material. In one option, the solid body may be a block of metal that has been machined, die cast and/or printed on a three-dimensional printer. Similarly, the solid body may be made of a rigid plastic that has been injection molded, machined and/or printed on a three-dimensional printer. When the solid body is made with metal and/or plastic, the threads in the third hole may be provided by machining or forming about a threaded insert. Furthermore, the solid body may or may not have internal voids for the purpose of reducing the mass of the solid body without compromising the rigidity of the solid body.

The base surface is to be directed face-to-face with an exterior surface of the vehicle, such as the exterior surface of a vehicle front pillar. The top surface of the solid body is opposite of the base surface and is generally directed away from the exterior surface of the vehicle. While the base surface may be contoured in a manner that is complementary to the contour of the exterior surface of the vehicle at a location where the solid body is to be secured, the top surface may be contoured in various manners. For example, the top surface may be contoured to avoid sharp points, avoid collection of water or dirt, and/or to visually coordinate with features of the vehicle. Furthermore, size and shape of the solid body, including the contour of the top surface, should be selected to avoid interfering with the operation of the vehicle door, including opening and closing of the door as well as removal and installation of the door from its hinges. The solid body may be securely and removably attachable to the vehicle yet may remain on attached to the vehicle while avoiding interference with opening, closing, removal and installation of the door. The contour of the base surface may be flat where the exterior surface of the vehicle is flat in the location where the solid body is to be secured. However, the base surface may also have a contour that is convex, concave, irregular or complex.

The first and second holes extend through the solid body from the base surface to the top surface. The central axis of the first and second holes may be parallel, but this is not a requirement. Rather, the central axis of the first hole should align with a central axis of the first threaded hole in the vehicle and the central axis of the second hole should aligned with a central axis of the second threaded hole in the vehicle. Accordingly, the solid body may be secured to the vehicle with first and second screws that extend through the first and second holes, respectively. The first and second holes preferably each have a counterbore that opens to the top surface and extends below the top surface of the solid body a distance that allows the head of the first and second screws to be flush or recessed below the top surface. Most preferably, the counterbore extends sufficiently below the top surface to receive the screw head and a lock washer and still not extend above the top surface. The counterbore may have a diameter that is only slightly larger than the diameter of the screw head and any lock washer. The first and second holes may have a diameter that is slightly larger than the diameter of the screw threads, yet smaller that the diameter of the screw head and any lock washer.

The third hole opens to the top surface in an area between the counterbores of the first and second holes, and the third hole is threaded to receive a threaded screw that attaches a mirror. In some embodiments, the third hole is the only hole in the solid body that is threaded. The threads of the third hole may be selected for mating with a threaded end of a post or arm that extends from a mirror assembly. More specifically, the internal threads of the third hole may match the external threads of the post or arm. Matching threads should have the same or compatible pitch, number of starts, and diameters. Most preferably, the internal threads of the third hole and the external threads of the post or arm will be standard threads according to a particular specification. For example, the screw threads may be formed according to a given size of the International Organization for Standards (ISO) or the Unified Thread Standard (UTS). Furthermore, the third hole may be a blind threaded hole that does not open to the base surface, or the third hole may extend completely through the solid body to open to both the base surface and the top surface.

In some embodiments, the solid body may have a first end, a second end, a first side and a second side. Optionally, the solid body may be symmetrical from side-to-side and/or symmetrical from end-to-end. The solid body may also have a side-to-side width that is less than a distance between the central axis of the first hole and the central axis of the second hole. In one non-limiting example, the solid body may have a total thickness between the base surface and the top surface that is less than or equal to 40 millimeters, and preferably less than or equal to 30 millimeters. However, the top surface may be contoured relative to the base surface such that the thickness of the solid body may be reduced across much of the top surface. This may be accomplished with a top surface that tapers downward from a central area toward the first and second ends. Such tapering may help avoid interference with operation of the door, reduce sharp corners, and reduce collection of water and dirt. In addition, the solid body may have beveled edge between the top surface and first and second sides of the solid body. The shape of the solid body, when viewed from the base or the top, may be rectangular or oval without limitation. In one option, the base surface has the shape of a rectangle with truncated corners.

Some embodiments provide a kit for securing a side mirror to a vehicle frame. The kit may include a solid body according any of the disclosed embodiments. For example, the solid body may have a base surface, a top surface, first and second holes through the solid body from the base surface to the top surface, and a third hole that opens to the top surface. The base surface may have a contour that is complementary to a contour of an exterior surface of the vehicle. Positioning the base surface face-to-face with the exterior surface of the vehicle enables a central axis of the first hole to be aligned with a central axis of a first threaded hole in the vehicle and enables a central axis of the second hole to be aligned with a central axis of a second threaded hole in the vehicle. Each of the first and second holes may also have a counterbore that opens to the top surface of the rigid body. Furthermore, the third hole may open to the top surface in an area between the counterbores of the first and second holes, and the third hole may be threaded to receive a threaded screw that attaches a mirror. The kit may further include first and second screws each having a threaded shaft and a head, wherein the threaded shaft of either of the first and second screws is insertable into either of the first and second holes until the head of the screw is received within the counterbore. The first and second screws are sized for threadably securing to the first and second threaded holes in the vehicle.

In some embodiments, the kit may further include a plug securable to the third hole for protecting the threads of the third hole in the absence of an attached mirror. For example, the plug may have a head that completely covers the third hole to block dirt and water from entering into the third hole when the third hole is not securing a mirror. Optionally, the plug may be a threaded screw plug that is threadably securable with the threads of the third hole. Furthermore, the plug may be plastic to form a seal with the threads and/or the top surface of the solid body.

In some embodiments, the kit may further include a compressible pad that is shaped to cover the base surface. The compressible pad may be made from various materials, such as a latex foam rubber, neoprene, silicone rubber, polyurethane foam, polyethylene foam, or felt. The compressible pad may have first and second holes positioned to be aligned with the first and second holes through the solid body when the compressible pad is positioned to cover the base surface. In one option, the compressible pad may have an adhesive layer and a disposable backing sheet covering the adhesive layer, where the disposable backing sheet is removable to facilitate adhering the compressible pad to the base surface. Accordingly, the compressible pad may prevent scratching of the exterior surface of the vehicle.

In some embodiments, the kit may further include a side mirror having a post, wherein the post has a distal end that is threaded for threadably connecting to the third hole. The post may include a lock nut that is tightened down against the top surface of the solid body after the threads on the end of the post have been screwed into the third hole. The lock nut may be useful for preventing the post from rotating during use and prevent the post from vibrating out of the third hole. A preferred side mirror may include a swivel joint coupled to the post for manually adjusting an angle between the side mirror and the post.

Some embodiments of the kit may further include a second unit of the solid body and a second set of the first and second screws for threadably securing the second unit of the solid body to a second pair of threaded holes in the vehicle. For example, the first and second pair of threaded holes in the vehicle may on opposing left and right sides of the vehicle, such as on an exterior surface of the front left and front right pillars of the vehicle. Optionally, the kit may further include a second plug, a second compressible pad, and/or a second mirror.

FIG. 1A is a driver's side view of a vehicle 10 with the doors (see driver's side door 12) installed. The driver's side door 12 is attached to the vehicle body 14 via hinges 16. Furthermore, the side door 12 also supports the side mirror 18. The circled area 20 is shown in greater detail below in reference to FIG. 2A and FIG. 2B.

Figure 1B:
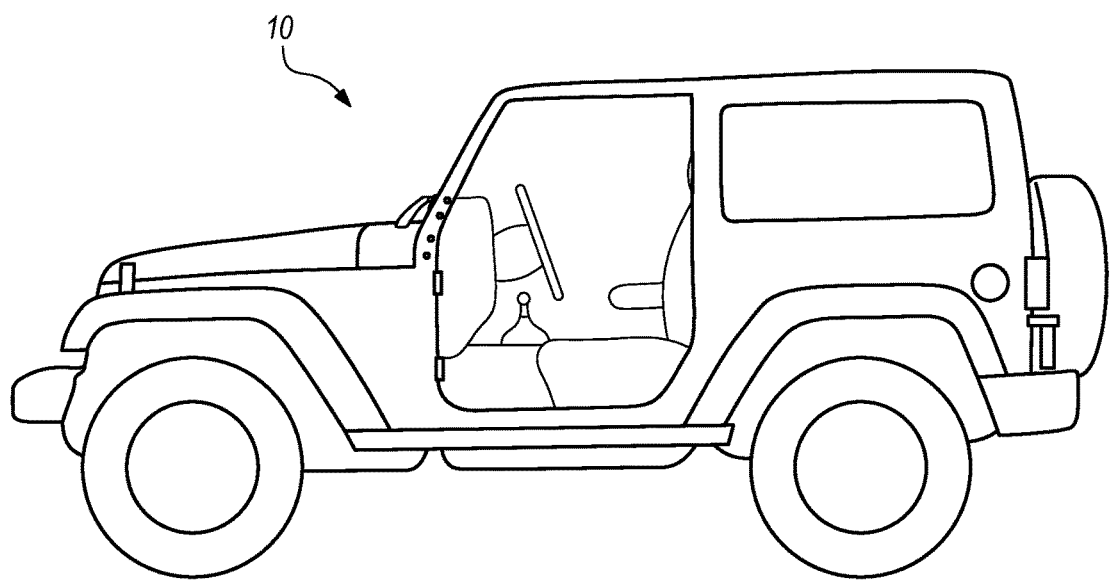
FIG. 1B is a driver's side view of the vehicle with the doors removed.

FIG. 1B is a driver's side view of the vehicle 10 with the doors (see driver's side door 12 of FIG. 1A) removed. This is a popular option for some vehicles, such as certain models of Jeep brand vehicles. Unfortunately, removing the side door 12 also causes removal of the side mirror 18.

Figure 2A:
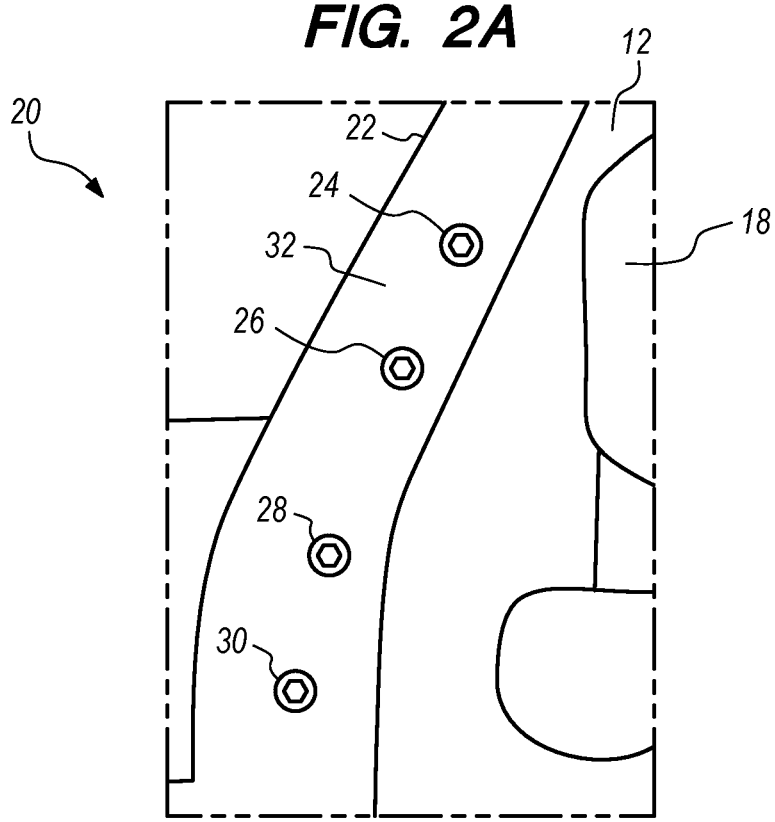
FIG. 2A is an enlarged side view of an exterior surface of the vehicle having multiple screws secured in threaded holes.

FIG. 2A is an enlarged side view of a front pillar 22 of the vehicle 10 having multiple screws 24, 26, 28, 30 secured in threaded holes that extend into the exterior surface 32 of the vehicle. The two threaded holes that engage the upper two screws 24, 26 may be used to secure a mirror attachment bracket in the form of the disclosed solid body. However, the screws 24, 26 may not long enough to attach the solid body, and may need to be replaced with longer screws.

Figure 2B:
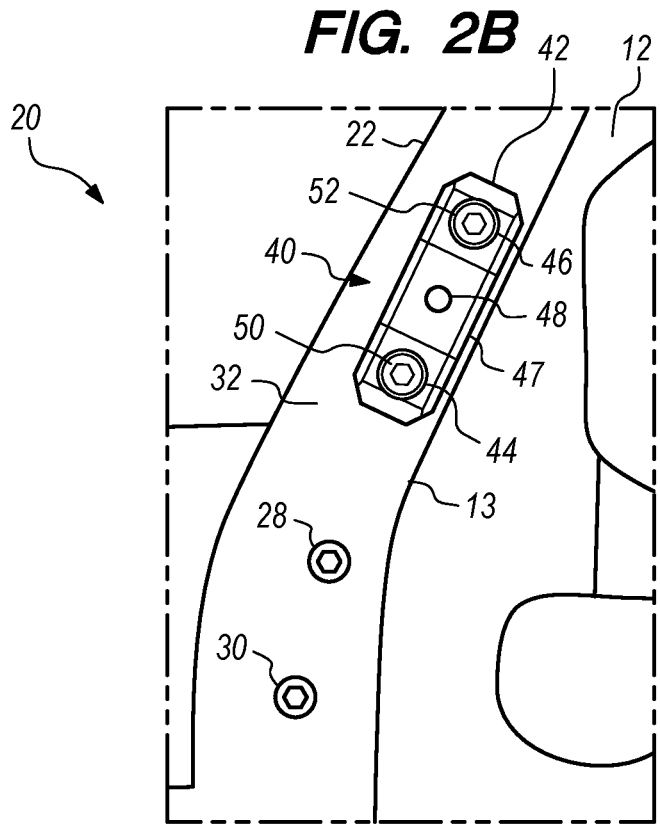
FIG. 2B is an enlarged side view of the exterior surface of the vehicle with a side mirror bracket coupled to the threaded holes in the front pillar.

FIG. 2B is an enlarged side view of the front pillar 22 of the vehicle with a side mirror bracket 40 coupled to the threaded holes (where screws 24, 26 were attached in FIG. 2A) in the front pillar. The mirror bracket 40 includes the solid body 42 having a first hole 44, a second hole 46, and a third hole 48. A first screw 50 is extended through the first hole 44 and threadably engaged with a first threaded hole in the vehicle and a second screw 52 is extended through the second hole 46 and threadably engaged with a first threaded hole in the vehicle. The solid body 42 has an edge 47 closest to the door 12 that is spaced apart from the edge 13 of the door 12 and has a size and shape that prevent the solid body 42 from interfering with the operation of the door 12. Accordingly, the mirror bracket 40 may be installed and kept in place whether or not the doors are open or closed, whether or not the doors are being installed or removed, and whether or not the side mirrors (not shown) are attached to the mirror bracket 40. The mirror bracket 40 may therefore be a permanent addition to the vehicle.

Figure 3A:
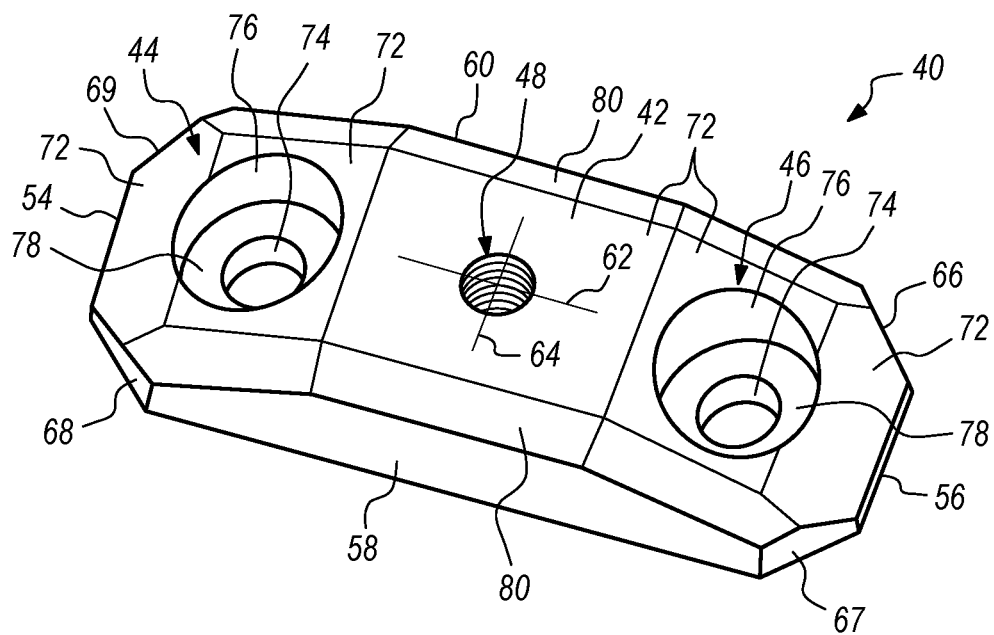
FIG. 3A is a perspective view of a solid body forming a side mirror bracket according to an embodiment.

FIG. 3A is a perspective view of the side mirror bracket 40 having the solid body 42 according to an embodiment. The solid body 42 also includes the first hole 44 near a first end 54 and the second hole 46 near a second end 56. Between the first hole 44 and the second hole 46 is a third hole 48 that is threaded. Each of the holes may be centered from one side 58 to the other side 60. As shown in the embodiments of FIG. 3A, the solid body may be symmetrical from side-to-side (i.e., relative to a centerline 62 midway between the sides 58, 60) and/or symmetrical from end-to-end (i.e., relative to a centerline 64 midway between the ends 54, 56).

The solid body 42 may have parallel sides 58, 60 and parallel ends 54, 56, such that the solid body 42 may be generally rectangular. The solid body 42 has a base surface (not shown; but see base surface 70 in FIG. 3B) and a top surface 72. While the base surface 70 and the top surface 72 may both be contoured, the base surface 70 include the primary downwardly facing surface of the solid body 42 and the top surface includes the primary upwardly facing surface of the solid body 42.

The generally rectangular solid body 42 may also have the corners 66, 67, 68, 69 between the sides 58, 60 and ends 54, 56 truncated. As shown, the truncated corners 66, 67, 68, 69 may be truncated at 45-degree angles and may be equal in length.

The first hole 44 and the second hole 46 may have the same dimensions and configuration. Each hole 44, 46 may have a lower portion 74 having a first diameter and an upper portion 76 having a second diameter that is greater than the first diameter. The lower portion 74 opens to the base surface 70 and the upper portion opens to the top surface 72. The upper portion 72 may be referred to as a counterbore that forms a shoulder 78. The third hole 48 extends into the solid body 42 from the top surface 72 and is internally threaded to receive a threaded screw that attaches a mirror. While the third hole 48 is open to the top surface 72, the third hole 48 may be a blind hole (i.e., does not extend through the base surface 70).

The solid body 42 may also have a beveled edge 80 between the top surface 72 and first and second sides 58, 60 of the solid body 42. The beveled edge 80 may have a flat surface, a slightly concave or cupped surface, or a slightly convex or bowed surface.

Figure 3B:
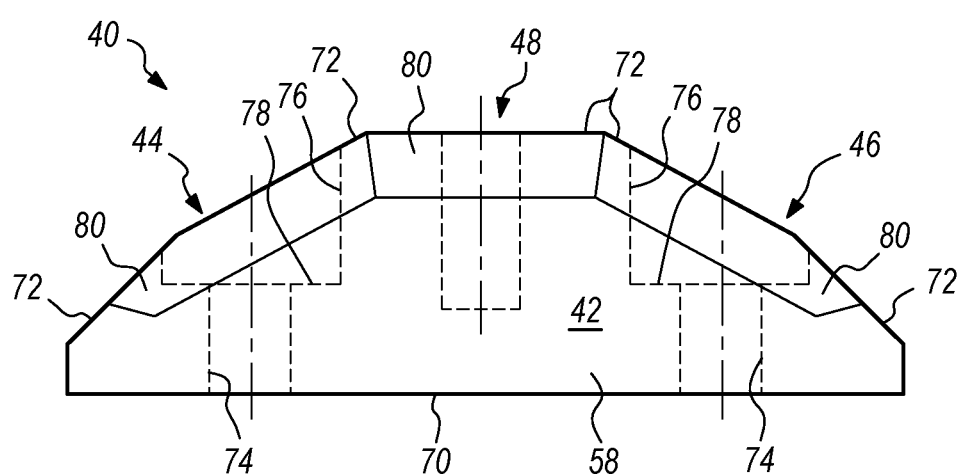
FIG. 3B is a side view of the solid body according to an embodiment.

FIG. 3B is a side view of the solid body 42 that forms the side mirror bracket 40. The side 58 extends from the base surface 70 upward to the top surface 72, which may include the beveled edge 80. The base surface 70 may have a contour that is complementary to a contour of an exterior surface of the vehicle. However, the base surface 70 is generally planar to be secured to a portion of the vehicle's exterior surface that is also generally planar. The contour of the top surface 72 may avoid sharp points, avoid concave portions that might collect water or dirt, and/or may visually coordinate with other features of the vehicle. Furthermore, size and shape of the solid body, including the contour of the top surface, may be selected to avoid interfering with the operation of the vehicle door, including opening and closing of the door as well as removal and installation of the door from its hinges.

The first hole 44, the second hole 46 and the third hole 48 are shown in dashed or phantom lines for perspective but may not actually be seen from the side. Each hole 44, 46 may have a lower portion 74 having a first diameter and an upper portion 76 having a second diameter that is greater than the first diameter. The lower portion 74 opens to the base surface 70 and the upper portion opens to the top surface 72. The upper portion 72 may be referred to as a counterbore that forms a shoulder 78. The third hole 48 extends into the solid body 42 from the top surface 72 and is internally threaded to receive a threaded screw that attaches a mirror. While the third hole 48 is open to the top surface 72, the third hole 48 may be a blind hole (i.e., does not extend through the base surface 70). The third hole 48 may have a central axis that is parallel to a central axis of the first hole 44 and a central axis of the second hole 46, and the third hole 48 may be positioned half way between the central axis of the first hole 44 and the central axis of the second hole 46.

Figure 4:
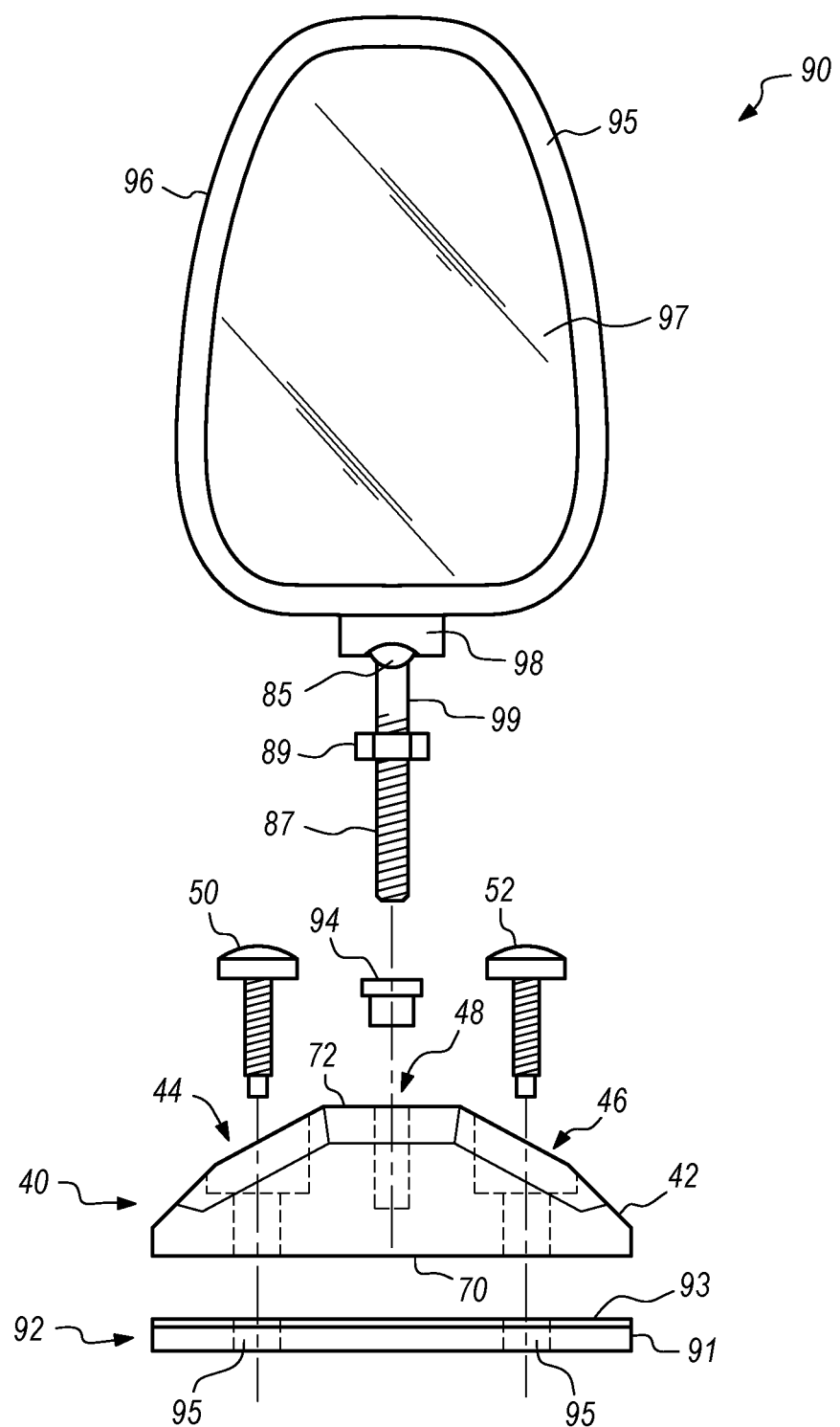
FIG. 4 is a diagram of a kit for securing a side mirror to a vehicle.

FIG. 4 is a diagram of a kit 90 for securing a side mirror to a vehicle. The kit 90 may include the side mirror bracket 40 and a pair of screws 50, 52 for securing the side mirror bracket 40 to the vehicle. Optionally, the kit 90 may further include any one or more components selected from a compressible pad 92, a screw hole plug 94, and a side mirror 96. Still further, the kit 90 may include a complete second set of the side mirror bracket 40, the pair of screws 50, 52, and any of the one or more components selected from a compressible pad 92, a screw hole plug 94, and a side mirror 96. Accordingly, a kit 90 might provide everything needed to install one side mirror or two side mirrors on a vehicle. Alternatively, the kit 90 may simply provide the side mirror bracket 40 and the pair of screws 50, 52, leaving the user to obtain the side mirror and any other desired components from other sources.

In the embodiment of FIG. 4, the compressible pad 92 may have a compressible felt layer 92 and a disposable backing sheet 93 covering the adhesive layer therebetween (not shown), where the disposable backing sheet 93 is easily removable to facilitate adhering the compressible pad to the base surface 70. The compressible pad 92 may also have pre-formed holes 95 that align with the first and second holes 44, 46, respectively, to facilitate passage of the screws 50, 52 therethrough.

The screw hole plug 94 may be secured in the third hole 48, either with a friction fit or a threaded connection. The screw hole plug 94 is used only when the side mirror 96 is not threadably secured to the third hole 48. The screw hole plug 94 may be beneficial for keeping water and/or dirt from collecting in the third hole 48 and causing damage to the threads.

The side mirror 96 has a frame 95 around the reflective mirror 97. The frame 95 forms a socket 98 of a ball joint or swivel. The side mirror 96 further includes a post or arm 99 that secures a ball 85 at a first end and may have screw threads 87 formed along the post 99 near a second end. Accordingly, the ball 85 may be manually rotated to a desired angle within the socket 98 and the screw threads 87 may be threadably secured into the third hole 48. A lock nut 89 may be received on the screw threads 87 prior to threadably securing into the third hole 48, and subsequently tightened down against the top surface 72 to avoid undesired rotation of the mirror 96 or undesired backing out of the screw threads 87 from the third hole 48.

FIG. 5A is a side view of an exterior surface 100 of the vehicle 10 (see FIGS. 1A and 1B). The two screws 24, 26 have their heads exposed and accessible along the exterior surface 100 consistent with FIG. 2A. The exterior surface 100 is connected to an internally threaded cylindrical wall 102 that extends inward from the exterior surface 100 to form first and second threaded holes 104, 106.

FIG. 5B is a side view of the side mirror bracket 40 secured to the exterior surface 100 of the vehicle making use of the two threaded holes 104, 106 in the vehicle. The base surface 70 is positioned face-to-face with the exterior surface 100 of the vehicle such that a central axis of the first hole 44 is aligned with a central axis of the first threaded hole 104 in the exterior surface 100 and a central axis of the second hole 46 is aligned with a central axis of the second threaded hole 106 in the exterior surface 100.

The first and second screws 50, 52 are extended into the first and second holes 44, 46, respectively, to engage the threads of the first and second threaded holes 104, 106. As the first and second screws 50, 52 are tightened, the heads of the screws 50, 52 press the lock washers 51, 53 against the respective shoulders 78. Further tightening of the screws 50, 52 may compress the compressible material 91 between the exterior surface 100 of the vehicle and the base surface 70 of the solid body 40. Accordingly, the side mirror bracket 40 is shown in an installed position where it may remain since it will not interfere with opening, closing, removal and installation of the door (see door 12 in FIG. 1A). Alternatively, the side mirror bracket 40 may be removed by reversing the steps described.

Notice that the screws 50, 52 used to secure the solid body 42 in FIG. 5B are longer than the screws 24, 26 that fill the holes 104, 106 in FIG. 5A. Accordingly, the installation kit 90 in FIG. 4 may include the longer screws 50, 52 needed for installation of the solid body 42. Furthermore, the side mirror bracket 40 is shown securing the optional screw plug 94 in the third hole 48.

FIG. 5C is a side view of a side mirror 96 secured to the side mirror bracket 40, which has been secured to the exterior surface 100 of the vehicle as discussed in reference to FIG. 5B. However, the screw plug 94 has been removed and the threads 87 of the post 99 have been threaded into the threaded third hole 48. When the post 99 of the side mirror 96 has been threaded a secure distance into the third hole 48, the lock nut 89 may be tightened down against the top surface 72 to hold the post firming in position without rotating or backing out. A desired angle of the side mirror 96 may be user-selected to facilitate a view of traffic along a side of the vehicle as viewed in the reflective mirror 97 from the user's seated position within the vehicle. Manual adjustment of the angle of the side mirror 96 may include pivoting the mirror frame 95 and attached socket 98 relative to the ball 85 of the post 99. The mirror angle may be adjusted about the ball 85 in any manner, including rotation about the axis of the post 99 and pivoting up/down and back/forth.

Embodiments Including an Adapter Bracket

Some embodiments provide an apparatus for securing a side mirror to a vehicle. The apparatus may comprise an adapter bracket having a plurality of first bracket holes arranged in a first hole pattern and a plurality of second bracket holes arranged in a second hole pattern. Each first bracket hole is positioned to align with a threaded hole in the exterior of the vehicle for receiving a screw through the first bracket hole and threadably fastening the screw to the threaded hole to secure the adapter bracket to the exterior of the vehicle. The apparatus further comprises a solid body having a base surface, a top surface opposite the base surface, first and second threaded holes extending into the solid body from the base surface, and a third threaded hole extending into the solid body from the top surface in a central area between the first and second holes. The first and second threaded holes are spaced apart to align with one of the second bracket holes, wherein screws may extend through the second bracket holes to be threadably fastened to the first and second threaded holes to secure the solid body to the adapter bracket. The third threaded hole is adapted to threadably secure a threaded end of a post that is attached to the side mirror.

Some embodiments provide an adapter bracket having a configuration or contour that follows a contour of the exterior of the vehicle over a distance between at least two outwardly accessible threaded holes. For example, the vehicle may have outwardly accessible threaded holes for receiving threaded fasteners, such as a screw. These threaded holes may be used to secure body panels or other original or after-market components. However, the outwardly accessible threaded holes may not be conveniently positioned or oriented for any use other than their original purpose, such as securing a body panel. Some vehicles may have no outwardly accessible threaded holes in a desired area and may only have outwardly accessible threaded holes in distant locations and in varied orientations.

The adapter bracket is configured to extend along the exterior of the vehicle and position each of the plurality of first bracket holes into alignment with one of the threaded holes in the exterior of the vehicle. For example, the adapter bracket may be configured to align one of the first bracket holes with a first threaded hole in the exterior of the vehicle and to align another of the first bracket holes with a second threaded hole in the exterior of the vehicle. One or more additional first bracket holes may also be aligned with additional threaded holes in the exterior of the vehicle. Optionally, the first threaded hole in the exterior of the vehicle may be upwardly directed, such as in an area between a hood and front windshield, and the second threaded hole in the exterior of the vehicle may be laterally directed, such as in a side area or transitional area between the upwardly direct area and the side area. Accordingly, the configuration or contour of the adapter bracket must not only extend between the threaded holes in the exterior of the vehicle but must also extend over the exterior surface of the vehicle between the threaded holes. Preferably, the adapter bracket extends over the exterior surface of the vehicle to leave a gap therebetween except in the immediate area around the first bracket holes where the adapter bracket is stabilized in a desired position by threaded screws drawing the adapter bracket tightly against the exterior surface of the vehicle. The adapter bracket may also have a size and shape that avoids interference with the use of various components of the vehicle with the adapter bracket secured to the exterior of the vehicle, such as the opening of a side door and/or the opening of a hood that are each hinged to the vehicle.

In some embodiments, the adapter bracket is a metal plate that has at least two straight bend lines. The two bend lines provide the bracket with the necessary configuration or contour to extend between the exterior accessible threaded holes in the vehicle and to extend over the exterior surface of the vehicle. In one example, a first bend line may separate a first portion of the adapter bracket that extends over an upward facing portion (cowl area) of the vehicle and a second portion of the adapter bracket that extends along an upright portion (pillar area) of the vehicle. Continuing with the example, a second bend line may separate the second portion of the adapter bracket and a third portion of the adapter bracket that extends along the upright portion (pillar area) and downward to a lateral portion (a quarter panel or fender area) of the vehicle. Accordingly, one first bracket hole in the first portion of the adapter bracket may be aligned with an exterior accessible threaded hole in the cowl area and another first bracket hole in the third portion of the adapter bracket may be aligned with an exterior accessible threaded hole in the quarter panel area.

In some embodiments, the plurality of first bracket holes and the plurality of second bracket holes are not threaded. For example, a screw may be extended through the any of the first bracket holes to be threaded into a threaded hole in the structure of the vehicle. Similarly, a screw may be extended through the any of the second bracket holes to be threaded into a threaded hole in the solid body connecter. The head of the screw should be large enough that the head won't pull through the first and second bracket holes, respectively. Optionally, the first and/or second bracket holes may be countersunk.

In embodiments described above, the solid body may have a base surface, a top surface opposite the base surface, first and second threaded holes extending into the solid body from the base surface, and a third threaded hole extending into the solid body from the top surface in a central area between the first and second holes. In one option, the third threaded hole is a blind threaded hole that does not open to the base surface. Furthermore, the base surface may have a shape of a rectangle with truncated corners. Still further, the solid body may have a first end, a second end, a first side and a second side, and wherein the solid body is symmetrical from side-to-side and symmetrical from end-to-end. It should be recognized that the solid body to be used in embodiments that include an adapter bracket may include any of the features or characteristics of the solid body that is attached directly to the vehicle without an adapter bracket, except that the first and second holes in the solid body are threaded holes extending into the solid body from the base surface. The first and second holes are preferably blind holes. As a result, the top surface of the solid body may be smooth whereas the top surface of the solid body for direct attachment to the vehicle may have a countersink.

Some embodiments provide a kit for securing a side mirror to a vehicle. The kit comprises an adapter bracket having a plurality of first bracket holes arranged in a first hole pattern and a plurality of second bracket holes arranged in a second hole pattern, wherein each first bracket hole is positioned to align with a threaded hole in the exterior of the vehicle for receiving a screw through the first bracket hole and threadably fastening the screw to the threaded hole to secure the adapter bracket to the exterior of the vehicle. The kit further comprises a solid body having a base surface, a top surface opposite the base surface, first and second threaded holes extending into the solid body from the base surface, and a third threaded hole extending into the solid body from the top surface in a central area between the first and second holes. Each of the first and second threaded holes are positioned to align with one of the second bracket holes, and the third threaded hole is adapted to threadably secure a threaded end of a post that is attached to the side mirror. Still further, the kit comprises first and second screws each having a threaded shaft and a head, wherein the threaded shaft of either of the first and second screws is insertable into either of the second bracket holes and threadably securable to the first and second threaded holes in the solid body to secure the solid body to the adapter bracket. Optionally, the kit may include any one or more additional component or feature of the corresponding apparatus embodiments described herein.

In some embodiments, the kit may further include a compressible pad that is shaped to cover the base surface, wherein the compressible pad has first and second holes positioned to be aligned with the first and second threaded holes in the solid body when the compressible pad is positioned to cover the base surface. Optionally, the compressible pad may have an adhesive layer and a disposable backing sheet covering the adhesive layer, wherein the disposable backing sheet is removable to facilitate adhering the compressible pad to the base surface.

In some embodiments, the kit may further include the side mirror having the post for threadably securing to the third threaded hole. Alternatively, the side mirror may be obtained separately, or the kit may include some other component that may be threadably secured using the third threaded hole. The side mirror preferably includes a swivel joint coupled to the post for manually adjusting an angle and/or orientation between the side mirror and the post. In another option, the kit may further include a plug securable to the third threaded hole for protecting the threads of the third threaded hole in the absence of an attached side mirror.

In some embodiments of the kit, the plurality of first bracket holes and the plurality of second bracket holes are not threaded. For example, a screw may be extended through the any of the first bracket holes to be threaded into a threaded hole in the structure of the vehicle. Similarly, a screw may be extended through the any of the second bracket holes to be threaded into a threaded hole in the solid body connecter. The head of the screw should be large enough that the head won't pull through the first and second bracket holes, respectively. Optionally, the first and/or second bracket holes may be countersunk.

In some embodiments, the adapter bracket may be a metal plate. Optionally, such a metal plate may have at least two straight bend lines to form a contour that follows a contour of the exterior of the vehicle.

In some embodiments, the adapter bracket may have a size and shape that avoids interference with the hinged opening and closing of a side door and hood with the adapter bracket secured to the exterior of the vehicle. Furthermore, the adapter bracket may have a size and shape that avoids interference with removal of a side door from the vehicle with the adapter bracket secured to the exterior of the vehicle and/or re-installation of the side door on the vehicle with the adapter bracket secured to the exterior of the vehicle.

In some embodiments, the kit may further include a set of one or more screws, each screw to be received through the first bracket hole and threadably fastened to the threaded hole in the exterior of the vehicle to secure the adapter bracket to the exterior of the vehicle. While it may be possible to reuse screws that are currently received in the threaded holes to secure the adapter bracket, the kit may include a set of screws that have the same thread type and pitch, but a longer shaft and/or head shape in order to account for the addition of the adapter bracket.

Figure 6:
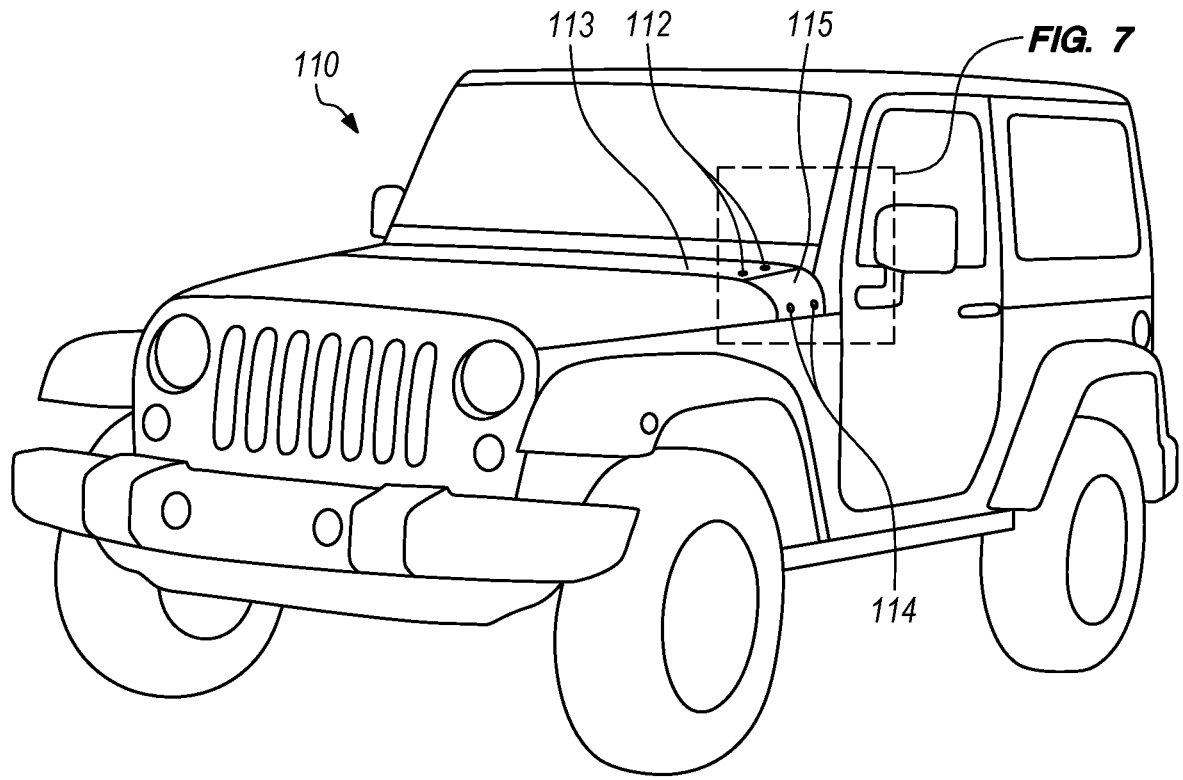
FIG. 6 is a perspective view of a vehicle having threaded holes in different positions that those of the vehicle in FIGS. 1A-2B.

FIG. 6 is a perspective view of a vehicle 110 having exterior accessible threaded holes in different positions that those of the vehicle 10 in FIGS. 1A-2B. As shown, the vehicle 110 has exterior accessible threaded holes 112 in a cowl area 113 and exterior accessible threaded holes 114 in a quarter panel area 115. Neither of these sets of exterior accessible threaded holes 112, 114 are suitable for direct attachment of the solid body 40 (see FIG. 2B).

Figure 7:
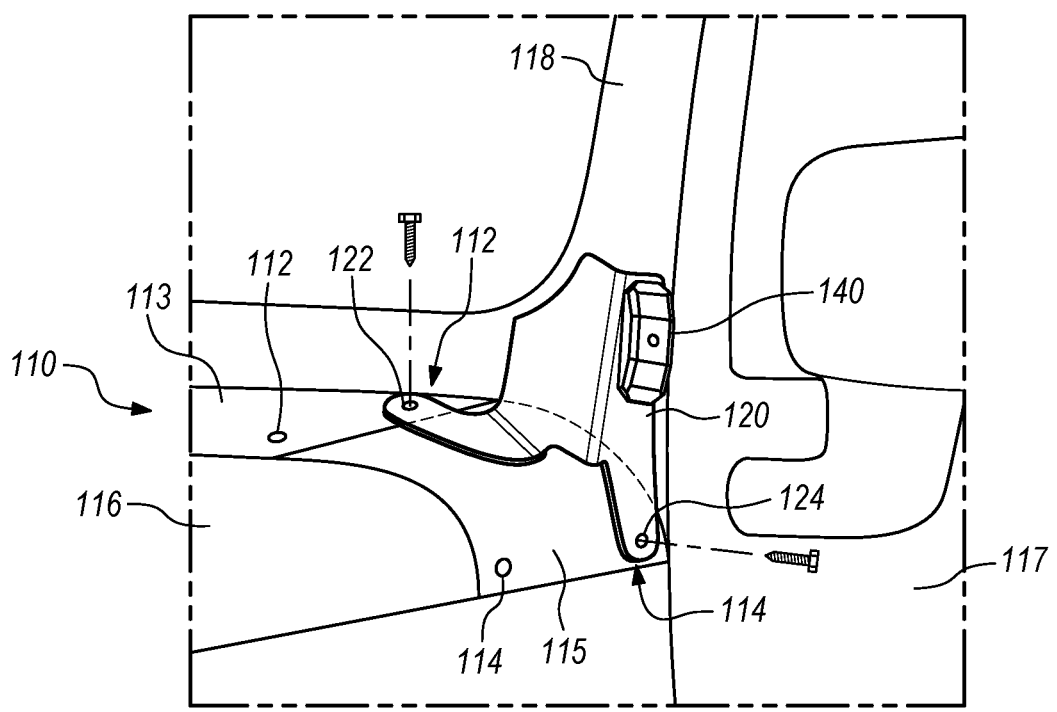
FIG. 7 is an enlarged perspective view of a portion of the vehicle of FIG. 6 with an adapter bracket in position for connection to the vehicle.

FIG. 7 is an enlarged perspective view of a portion of the vehicle of FIG. 6 with an adapter bracket 120 in position for connection to the vehicle 110. Specifically, the adapter bracket 120 is configured to align a first one of the first bracket holes 122 with a first threaded hole 112 in the exterior of the vehicle and to align as second one of the first bracket holes 124 with a second threaded hole in the exterior of the vehicle. As shown, the first threaded hole 112 is located in a cowl area of the vehicle and generally upwardly directed. The second threaded hole 114 is in a quarter panel area of the vehicle and generally laterally directed. Note that the adapter bracket 120 is configured to extend over the exterior surface of the vehicle between the two connections and to extend upward into a position where the solid body 140 is desired. Also notice that the adapter bracket 120 does not interfere with the opening of the hood 116 and does not interfere with the operation, removal or attachment of the side door 117. More detail about the adapter bracket 120 is provided in reference to FIG. 8.

Figure 8:
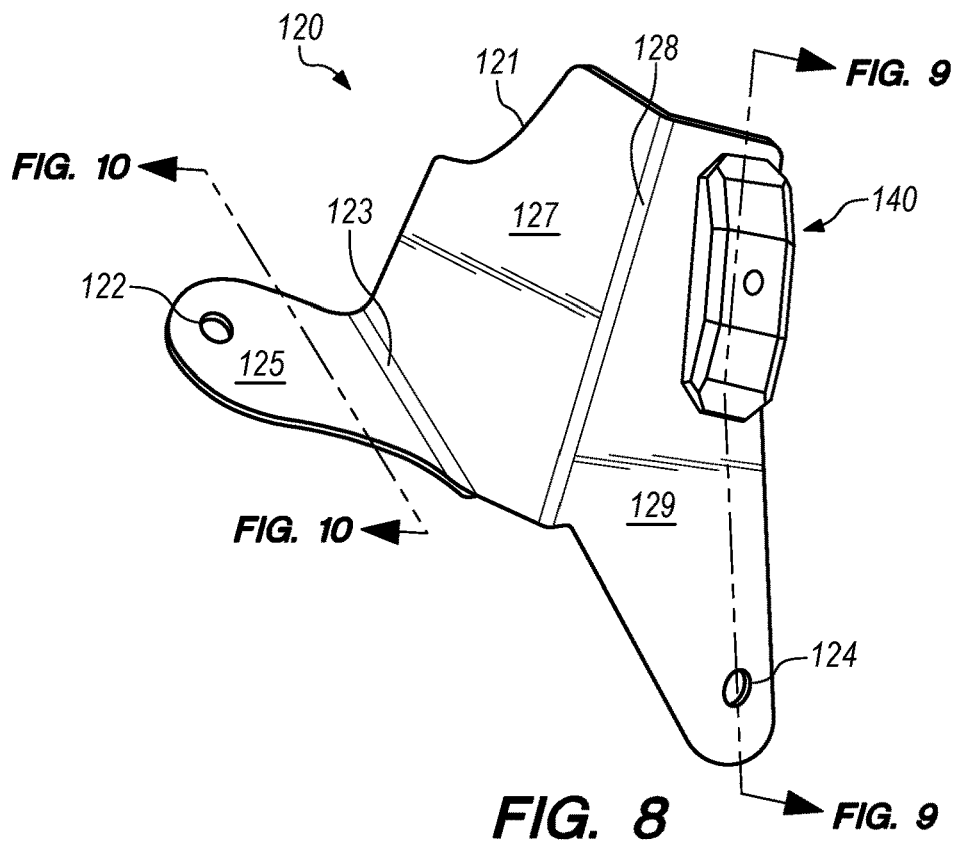
FIG. 8 is a perspective view of the adapter bracket with a solid body connector secured to the adapter bracket.

FIG. 8 is a perspective view of the adapter bracket 120 with a solid body connector 140 secured to the adapter bracket. The adapter bracket 120 is formed by a metal plate 121 that has a configuration or contour to extend between the exterior accessible threaded holes 112, 114 (See FIGS. 6-7) in the vehicle and to extend over the exterior surface of the vehicle. In the embodiment shown, the adapter bracket 120 has two straight bend lines. A first bend line 123 may separate a first portion 125 of the adapter bracket that extends over an upward facing portion (cowl area 113 shown in FIG. 7) of the vehicle and a second portion 127 of the adapter bracket that extends along an upright portion (pillar area 118 shown FIG. 7) of the vehicle. A second bend line 128 may separate the second portion 127 of the adapter bracket and a third portion 129 of the adapter bracket that extends along the upright portion (pillar area 118 shown in FIG. 7) and downward to a lateral portion (a quarter panel or fender area 115 shown in FIG. 7) of the vehicle. Accordingly, the first bracket hole 122 in the first portion 125 of the adapter bracket 120 may be aligned with an exterior accessible threaded hole 112 in the cowl area 113 (see FIG. 7) and the first bracket hole 124 in the third portion 129 of the adapter bracket 120 may be aligned with an exterior accessible threaded hole 114 in the quarter panel area 115 (see FIG. 7). The dimensions of each portion 125, 127, 129 and the angles of the bend lines 123, 128 may vary between various vehicle models.

Figure 9:
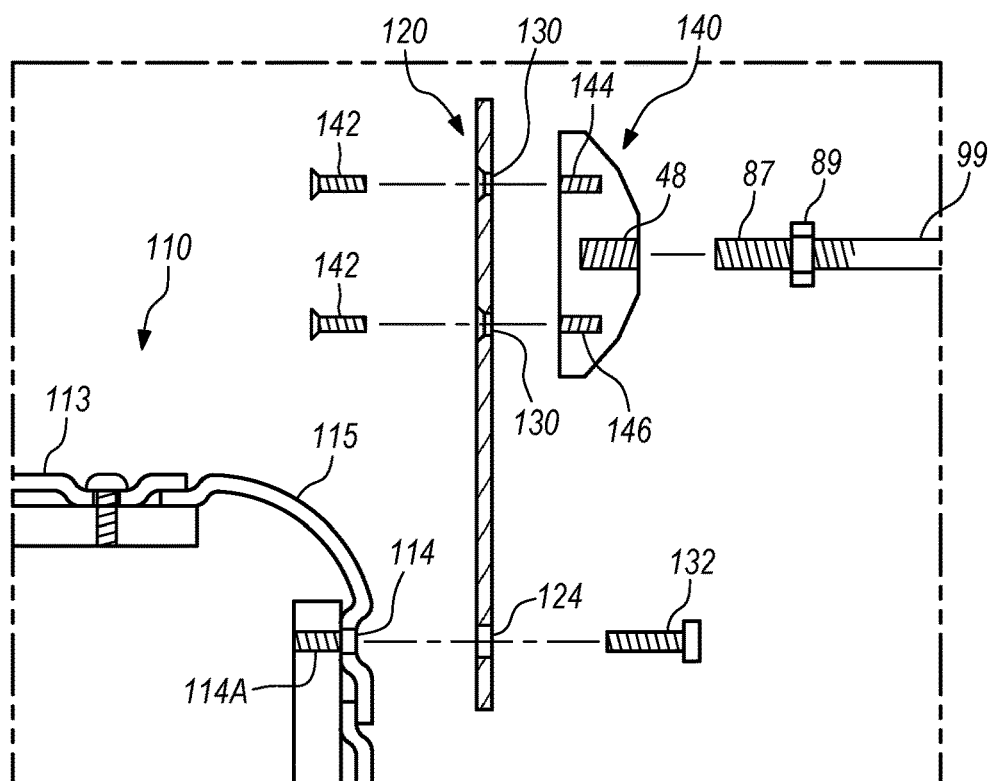
FIG. 9 is a cross-sectional side view of the adapter bracket and solid body taken along the line 9-9 shown in FIG. 8, as well as a representation of a first portion of the vehicle to which the adapter bracket is to be connected.

FIG. 9 is a cross-sectional side view of the adapter bracket 120 and solid body 140 taken along the line 9-9 shown in FIG. 8, as well as a representation of portions 113, 115 of the vehicle 110 to which the adapter bracket 120 is to be connected. The solid body 140 is preferably connected to the adapter bracket 120 before attaching the adapter bracket 120 to the vehicle. A pair of screws 142 may be inserted through the second bracket holes 130 from the inside surface (left side in FIG. 9) of the adapter bracket 120 toward to the solid body 140 positioned on the outside surface of the adapter bracket 120. The screws 142 are then threaded into the first and second threaded holes 144, 146 in the base or bottom surface of the solid body 140 until the solid body is securely attached to the adapter bracket 120. Since the solid body 140 is detachable from the adapter bracket 120, the solid body may be replaced in the event of damage to the solid body or if a different side mirror requires a different size and/or thread pitch in the threaded hole 48. Conversely, the detachability of the solid body 140 from the adapter bracket 120 means that the solid body 140 may be reused with multiple adapter brackets, wherein each adapter bracket is configured to be attached to a different vehicle having unique configurations and layouts of the exterior accessible threaded holes.

The adapter bracket may be connected to the vehicle by aligning the second bracket hole 124 with the exterior accessible threaded hole 114 and then threadably securing the screw 132 into the exterior accessible threaded hole 114. The exterior accessible threaded hole 114 may include both the unthreaded hole through the quarter panel 115 and the threaded hole 114A in a structural member of the vehicle that lies behind the quarter panel 115. While the screw 132 may be the same screw that originally secured the quarter panel 115 to the vehicle, the screw 132 may also be a new screw that is slightly longer to account for the thickness of the adapter bracket 130 and/or the depth of the countersink in the quarter panel 115 around the hole 114 than may no longer be accessible to the head of the screw 132. By comparison, the original screw securing the panel 113 in the cowl area of the vehicle shows the head of the screw received into the countersink.

Figure 10:
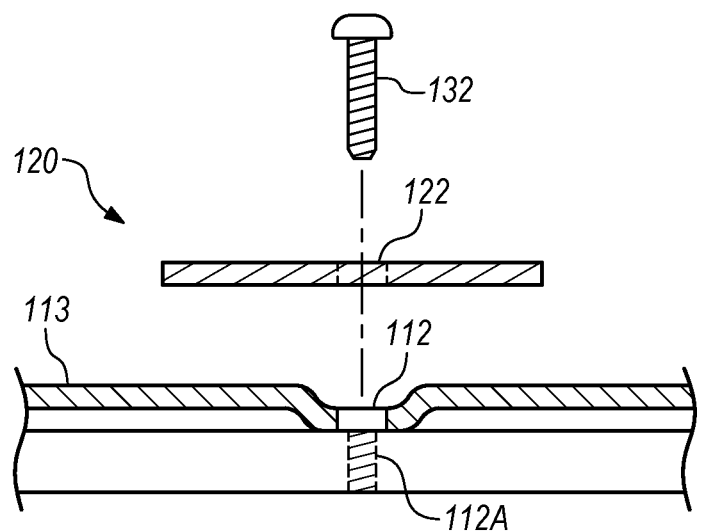
FIG. 10 is a cross-sectional side view of the adapter bracket taken along the line 10-10 shown in FIG. 8, as well as a representation of a second portion of the vehicle to which the adapter bracket is to be connected.

FIG. 10 is a cross-sectional side view of the adapter bracket 120 taken along the line 10-10 shown in FIG. 8, as well as a representation of a second portion of the vehicle to which the adapter bracket 120 is to be connected. For example, the second portion of the vehicle may include the cowl panel 113. The exterior accessible threaded hole 112 may include both the unthreaded hole through the cowl panel 113 and the threaded hole 112A in a structural member of the vehicle that lies behind the cowl panel 113.

Figure 11A:
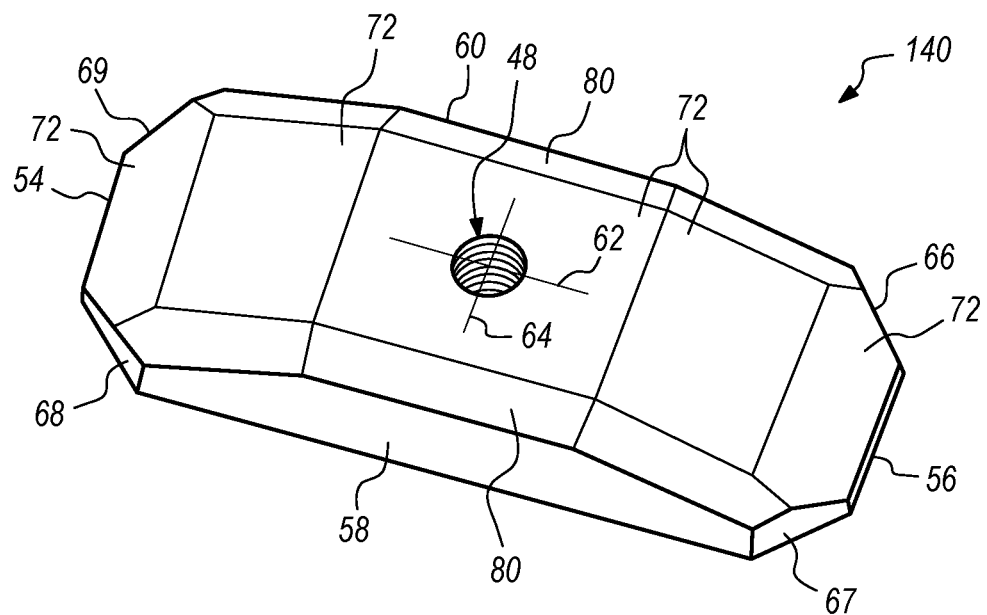
FIG. 11A is a perspective view of a solid body connector according to the embodiment used in FIGS. 6-9.

FIG. 11A is a perspective view of a solid body connector 140 according to the embodiment used in FIGS. 6-9. The solid body 140 includes a top surface 72 with a third (central) hole 48 that is threaded. The third or central hole may be centered from one side 58 to the other side 60. Furthermore, the solid body may be symmetrical from side-to-side (i.e., relative to a centerline 62 midway between the sides 58, 60) and/or symmetrical from end-to-end (i.e., relative to a centerline 64 midway between the ends 54, 56). The solid body 140 may have parallel sides 58, 60 and parallel ends 54, 56, such that the solid body 140 may be generally rectangular. The solid body 42 has a base surface (not shown; but see base surface 70 in FIG. 11B) and a top surface 72. While the base surface 70 and the top surface 72 may both be contoured, the base surface 70 includes the primary downwardly facing surface of the solid body 140 and the top surface includes the primary upwardly facing surface of the solid body 140. The generally rectangular solid body 140 may also have the corners 66, 67, 68, 69 between the sides 58, 60 and ends 54, 56 truncated. As shown, the truncated corners 66, 67, 68, 69 may be truncated at 45-degree angles and may be equal in length. The solid body 140 may also have a beveled edge 80 between the top surface 72 and first and second sides 58, 60 of the solid body 140. The beveled edge 80 may have a flat surface, a slightly concave or cupped surface, or a slightly convex or bowed surface.

Figure 11B:
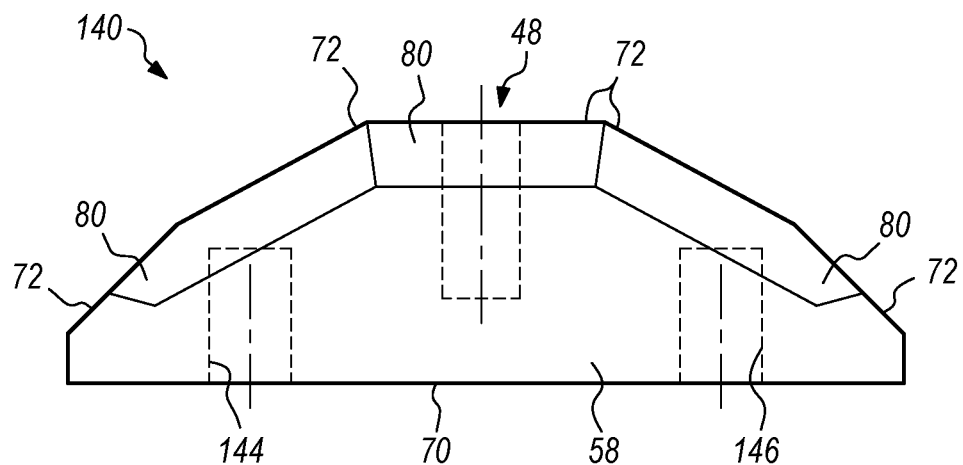
FIG. 11B is a side view of the solid body connector of FIG. 11A.

FIG. 11B is a side view of the solid body 140 connector of FIG. 11A that forms the side mirror connector. The side 58 extends from the base surface 70 upward to the top surface 72, which may include the beveled edge 80. The base surface 70 may have a contour that is complementary to a contour of an exterior surface of the adapter bracket 120 (see FIGS. 7-9). However, the base surface 70 may be generally planar to be secured to a portion of the adapter bracket surface that is also generally planar. The contour of the top surface 72 may avoid sharp points, avoid concave portions that might collect water or dirt, and/or may visually coordinate with other features of the vehicle. Furthermore, the size and shape of the solid body, including the contour of the top surface, may be selected to avoid interfering with the operation of the vehicle door, including opening and closing of the door as well as removal and installation of the door from its hinges.

The first hole 144, the second hole 146 and the third hole 48 are shown in dashed or phantom lines for perspective but may not be seen from the side. Each hole 144, 146 may open to the base surface 70 and is internally threaded to receive a threaded screw that attached the solid body 140 to the adapter bracket 120. The third hole 48 extends into the solid body 42 from the top surface 72 and is internally threaded to receive a threaded screw or post that attaches a mirror. While the third hole 48 is open to the top surface 72, the third hole 48 may be a blind hole (i.e., does not extend through to the base surface 70). The third hole 48 may have a central axis that is parallel to a central axis of the first hole 44 and a central axis of the second hole 46, and the third hole 48 may be positioned half-way between the central axis of the first hole 44 and the central axis of the second hole 46.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus for securing a side mirror to a vehicle, comprising:

an adapter bracket having a plurality of first bracket holes arranged in a first hole pattern and a plurality of second bracket holes arranged in a second hole pattern, wherein each first bracket hole is positioned to align with a threaded hole in the exterior of the vehicle for receiving a screw through the first bracket hole and threadably fastening the screw to the threaded hole to secure the adapter bracket to the exterior of the vehicle; and a solid body having a base surface, a top surface opposite the base surface, first and second threaded blind holes extending into the solid body from the base surface, and a third threaded hole extending into the solid body from the top surface in a central area between the first and second holes, wherein each of the first and second threaded blind holes are aligned with one of the second bracket holes, wherein screws extend through the second bracket holes and are threadably fastened to the first and second threaded blind holes to secure the solid body to the adapter bracket, and wherein the third threaded hole is adapted to threadably secure a threaded end of a post that is attached to the side mirror.

2. The apparatus of claim 1, wherein the plurality of first bracket holes and the plurality of second bracket holes are not threaded.

3. The apparatus of claim 1, wherein each of the first bracket holes are countersunk.

4. The apparatus of claim 1, wherein the third threaded hole is a blind threaded hole that does not open to the base surface.

5. The apparatus of claim 1, wherein the adapter bracket has a contour that follows a contour of the exterior of the vehicle.

6. The apparatus of claim 5, wherein the adapter bracket is a metal plate that has at least two straight bend lines.

7. The apparatus of claim 1, wherein the adapter bracket has a size and shape that avoids interference with opening of a side door and hood that are hinged to the vehicle with the adapter bracket secured to the exterior of the vehicle.

8. The apparatus of claim 7, wherein the size and shape of the adapter bracket avoids interference with removal of a side door from the vehicle with the adapter bracket secured to the exterior of the vehicle.

9. The apparatus of claim 1, wherein the base surface has a shape of a rectangle with truncated corners.

10. The apparatus of claim 1, wherein the solid body has a first end, a second end, a first side and a second side, and wherein the solid body is symmetrical from side-to-side and symmetrical from end-to-end.

11. A kit for securing a side mirror to a vehicle, comprising:
an adapter bracket having a plurality of first bracket holes arranged in a first hole pattern and a plurality of second bracket holes arranged in a second hole pattern, wherein each first bracket hole is positioned to align with a threaded hole in the exterior of the vehicle for receiving a screw through the first bracket hole and threadably fastening the screw to the threaded hole to secure the adapter bracket to the exterior of the vehicle;

a solid body having a base surface, a top surface opposite the base surface, first and second threaded blind holes extending into the solid body from the base surface, and a third threaded hole extending into the solid body from the top surface in a central area between the first and second holes, wherein each of the first and second threaded blind holes are positioned to align with one of the second bracket holes, and wherein the third threaded hole is adapted to threadably secure a threaded end of a post that is attached to the side mirror; and first and second screws each having a threaded shaft and a head, wherein the threaded shaft of either of the first and second screws is insertable into either of the second bracket holes and threadably securable to the first and second threaded blind holes in the solid body to secure the solid body to the adapter bracket.

12. The kit of claim 11, further comprising:
a compressible pad that is shaped to cover the base surface, wherein the compressible pad has first and second holes positioned to be aligned with the first and second threaded blind holes in the solid body when the compressible pad is positioned to cover the base surface.

13. The kit of claim 12, wherein the compressible pad has an adhesive layer and a disposable backing sheet covering the adhesive layer, wherein the disposable backing sheet is removable to facilitate adhering the compressible pad to the base surface.

14. The kit of claim 11, further comprising:
the side mirror having the post for threadably securing to the third threaded hole.

15. The kit of claim 14, wherein the side mirror includes a swivel joint coupled to the post for manually adjusting an angle between the side mirror and the post.

16. The kit of claim 11, further comprising:
a plug securable to the third threaded hole for protecting the threads of the third threaded hole with the side mirror detached.

17. The kit of claim 11, wherein the plurality of first bracket holes and the plurality of second bracket holes are not threaded.

18. The kit of claim 11, wherein the adapter bracket is a metal plate that has at least two straight bend lines to form a contour that follows a contour of the exterior of the vehicle.

19. The kit of claim 11, wherein the adapter bracket has a size and shape that avoids interference with opening and closing of a side door and hood that are hinged to the vehicle with the adapter bracket secured to the exterior of the vehicle, and the size and shape of the adapter bracket further avoids interference with removal of a side door from the vehicle with the adapter bracket secured to the exterior of the vehicle.

20. The kit of claim 11, further comprising:
a set of one or more screws, each screw to be received through the first bracket hole and threadably fastened to the threaded hole in the exterior of the vehicle to secure the adapter bracket to the exterior of the vehicle.

* * * * *